Figure 7:
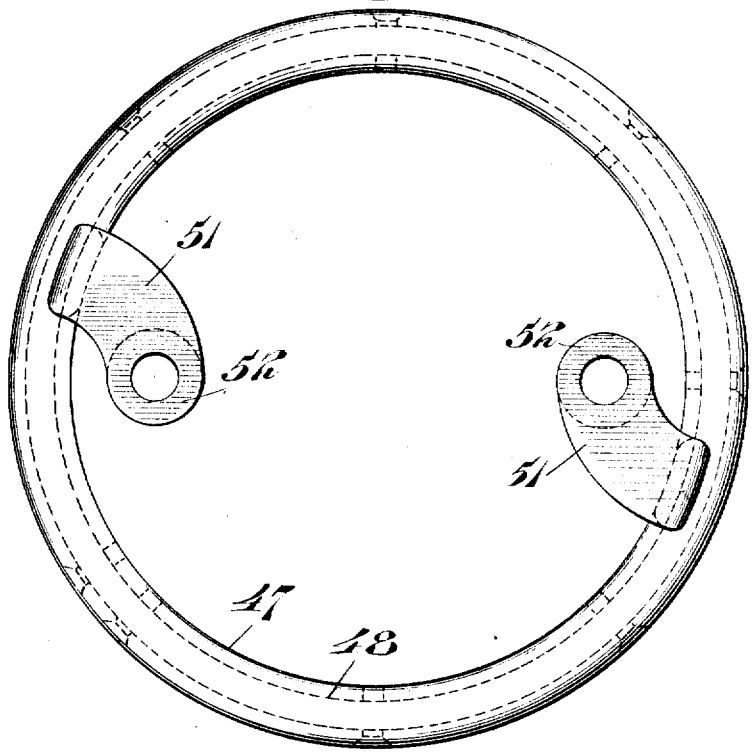

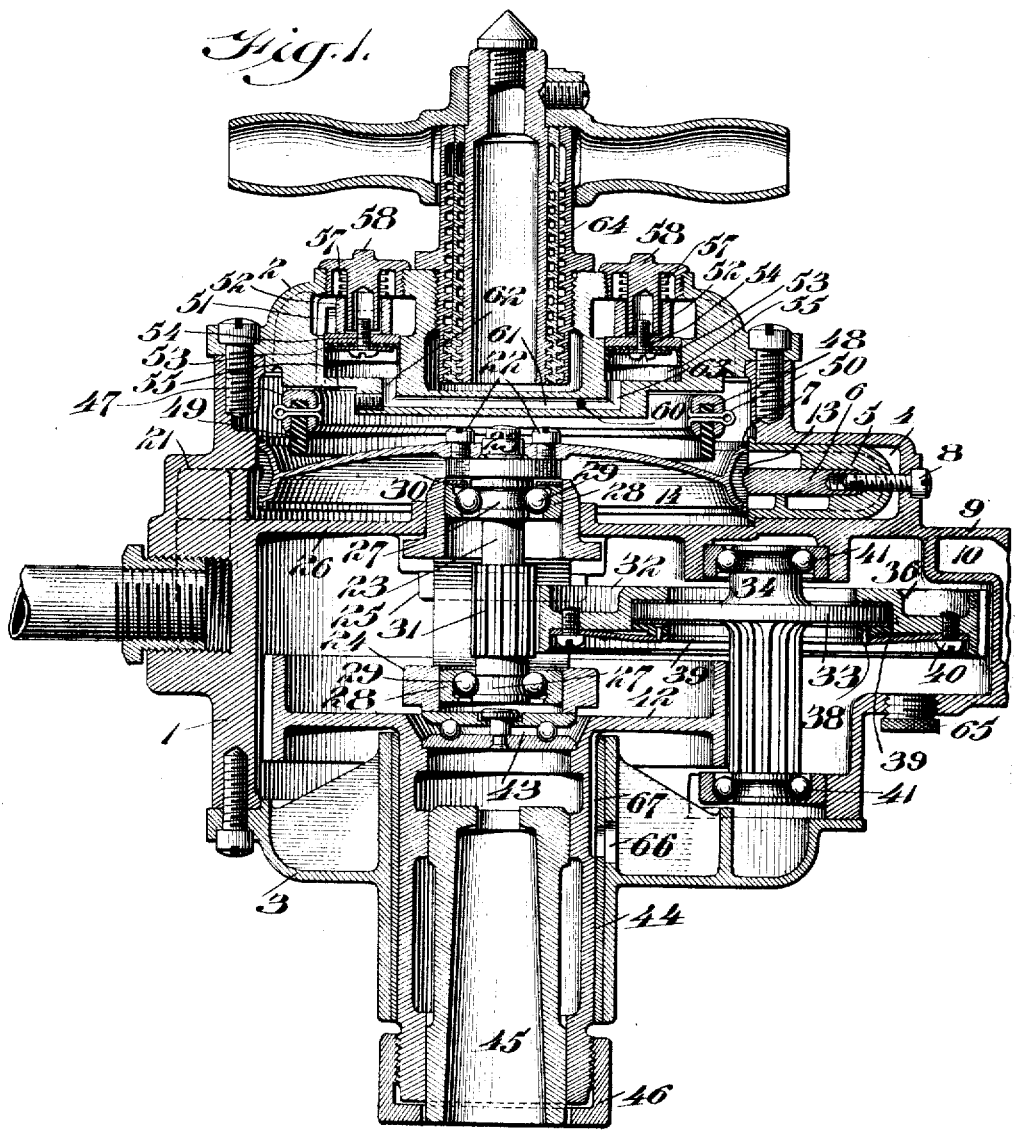

J. W. SMITH.
TURBO PNEUMATIC DRILL.
APPLICATION FILED JAN. 14, 1908.
910,428.
Patented Jan. 19, 1909.
6 SHEETS—SHEET 2.
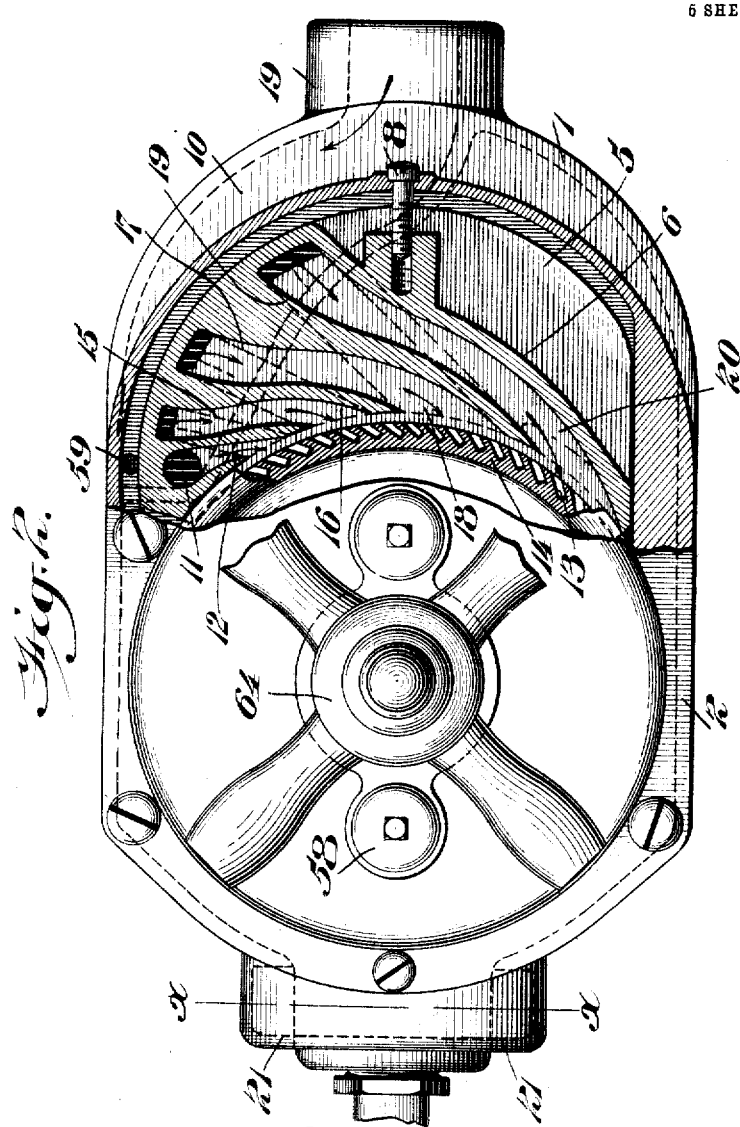
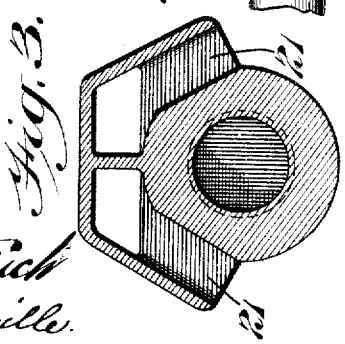
Witnesses
H. Shitterich
L. Douville
Inventor
John W. Smith
By Wiedersheim & Fairbanks
Attorneys

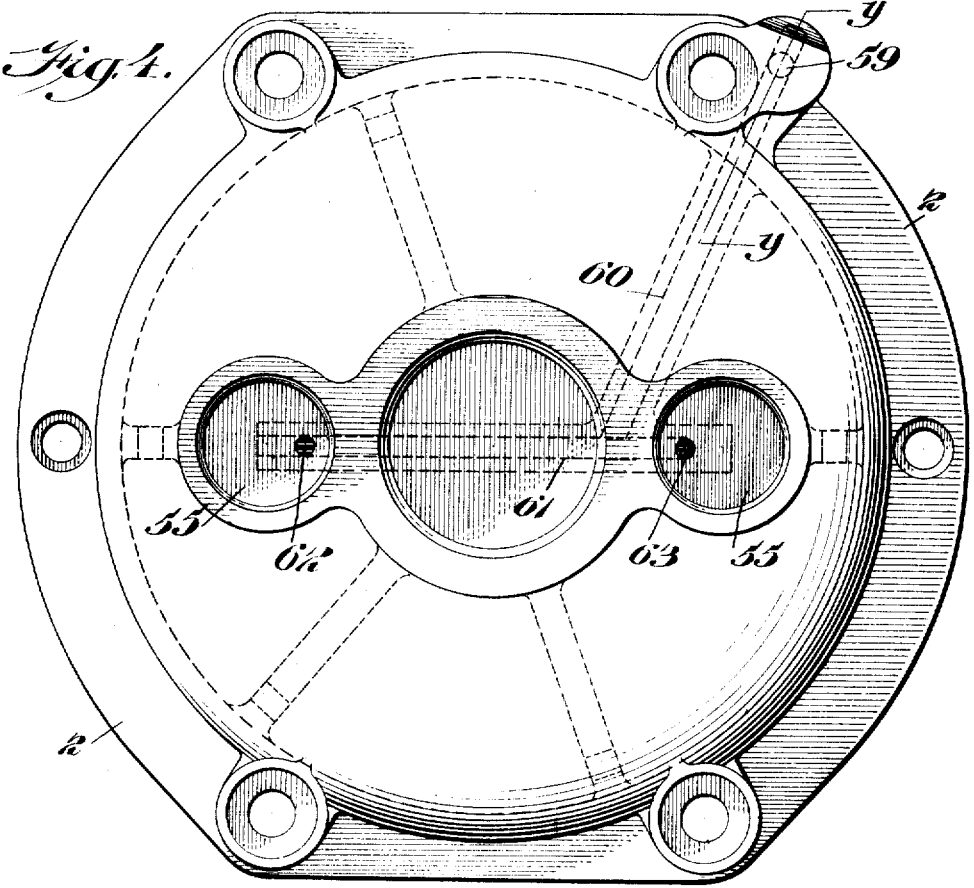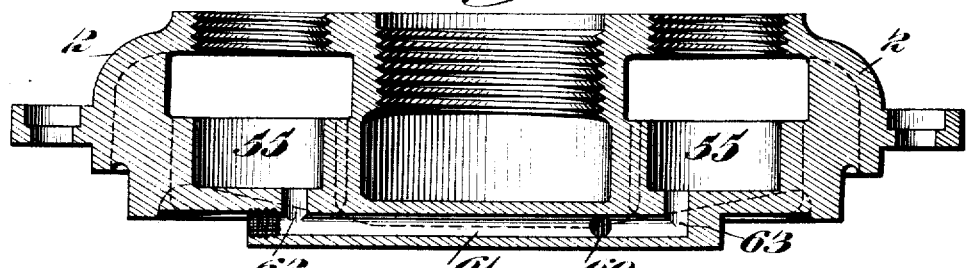

J. W. SMITH.
TURBO PNEUMATIC DRILL.
APPLICATION FILED JAN. 14, 1908.

910,428.

Patented Jan. 19, 1909.

5 SHEETS—SHEET 4.

Witnesses
H. G. Dieterich
L. Douville

Inventor
John W. Smith
By Wiedersheim & Fairbanks
Attorneys

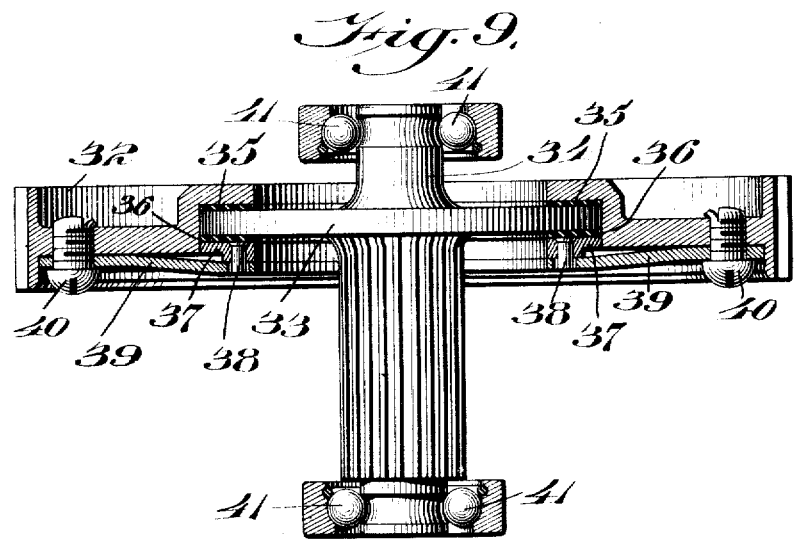
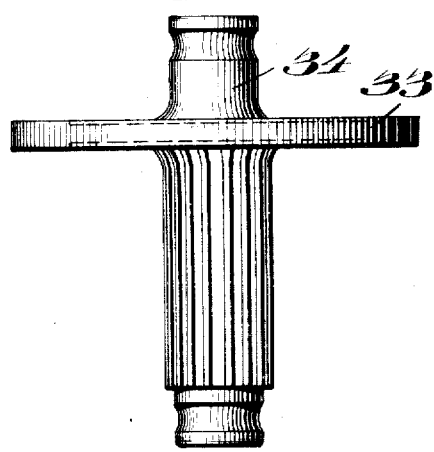
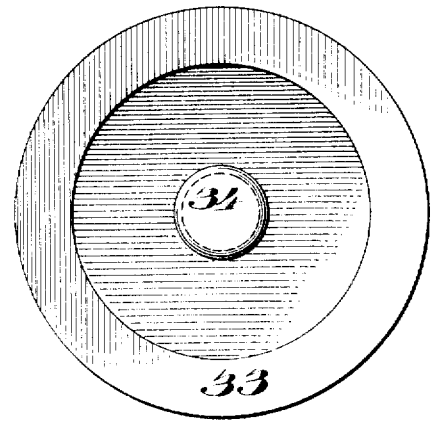

UNITED STATES PATENT OFFICE.

JOHN W. SMITH, OF PHILADELPHIA, PENNSYLVANIA.

TURBO-PNEUMATIC DRILL.

No. 910,428.	Specification of Letters Patent.	Patented Jan. 19, 1909.

Application filed January 14, 1908. Serial No. 410,750.

*To all whom it may concern:*

Be it known that I, JOHN W. SMITH, a citizen of the United States, residing in the city and county of Philadelphia, State of Pennsylvania, have invented a new and useful Turbo-Pneumatic Drill, of which the following is a specification.

In the application of the turbine to portable pneumatic drills, the great amount of energy stored up in the rotor must be carefully considered and some means employed for quickly bringing the rotor to rest after the work has been performed. It is also essential that some means be employed for permitting the rotation of the rotor in case the drill or other working tool sticks in the work. It is also essential that the stator, by means of which the motive fluid is impinged against the buckets, maintain a close clearance with the rotor and I have found in practice that this can be effectually accomplished by employing a complete stator inserted in such a manner that it can be easily renewed and at the same time reëstablish the original clearance.

To the above ends my present invention comprises a novel construction of a turbo pneumatic drill comprising, in a simplified form, a rotor, a detachable stator for impinging the motive fluid, and speed changing mechanism.

My invention further consists of a novel construction of a drill comprising a detachable stator for impinging the motive fluid against the buckets on the rotor, and a novel construction of speed changing mechanism.

It further consists of a novel construction of automatic braking mechanism co-acting with the rotor.
It further consists of a novel construction of speed changing mechanism in conjunction with which a novel construction of a friction clutch is employed.

It further consists of a novel construction of a bearing bracket in which the power shaft is mounted in a novel manner.

It further consists of other novel features of construction, all as will be hereinafter fully set forth.
For the purpose of illustrating my invention I have shown in the accompanying drawing, one form thereof, since this embodiment has been found in practice to give satisfactory and reliable results, although it is to be understood that the various instrumentalities of which my invention consists can be variously arranged and organized and that my invention is not limited to the exact arrangement and organization of these instrumentalities as herein shown.

Figure 8:
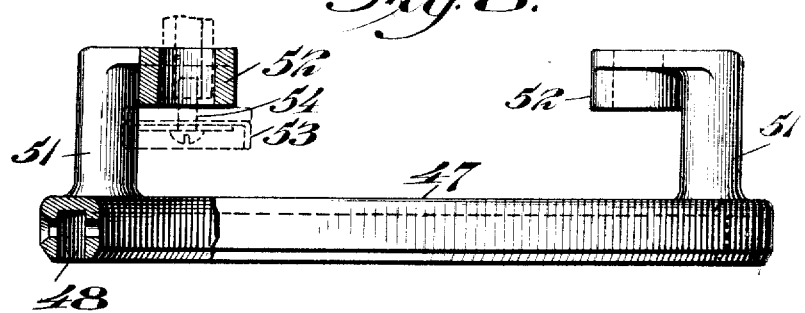

Figure 1 represents a sectional elevation of a pneumatic drill embodying my invention. Fig. 2 represents a top plan view partly in section. Fig. 3 represents a section on line $x$—$x$, Fig. 2, showing the exhaust passages. Fig. 4 represents a top plan view of the feed head. Fig. 5 represents a sectional view of Fig. 4. Fig. 6 represents a section on lines $y$—$y$, Fig. 4. Fig. 7 represents a top plan view of the friction ring. Fig. 8 represents a side elevation, partly in section, of Fig. 7. Fig. 9 represents a sectional elevation, showing more clearly the speed changing mechanism and the friction clutch. Fig. 10 represents a side elevation of the idler pinion seen in Fig. 9. Fig. 11 represents a plan view of Fig. 10.

Similar numerals of reference indicate corresponding parts in the figures.

Referring to the drawings:—The casing of the drill may have any desired form or contour and in the present instance comprises a body portion 1, to which is secured in any suitable manner, the upper casing member 2, which forms the feed head, and the lower casing member 3.

In order to more clearly describe my invention I will describe in sequence the stator, the rotor and its adjuncts, the speed changing mechanism and friction clutch, and the automatic braking mechanism for the rotor.

The casing is provided with a chamber 4 in which the stator is secured, said stator comprising in the present instance a channeled member 5 which forms, with the inserted member 6, channels for the passage of the motive fluid. The member 5 is provided at its inner end with flanges 7 which engage the inner end of casing 1.

8 designates a fastening device such as a screw or equivalent device which is loose in the casing 1, but has threaded engagement with the members 5 and 6 of the stator, whereby the stator is properly assembled at all times with respect to the parts co-acting therewith.

As will be understood from Fig. 2, the motive fluid enters through the handle (not shown) which is attached to the boss 9 and passes, by means of passage 10 and port 11, to the channel 12 of the stator and impinges against the buckets 13 carried by the rotor 14, thence rearwardly through channel 15, forwardly through channel 16, against buckets 13, then rearwardly through chamber 18, impinging against the buckets 13, and then rearwardly through passage 19, forwardly through passage 20 and impinging against the buckets 13.

The motive fluid passes from the rotor through exhaust passages 21, as seen in Figs. 1, 2 and 3 into the atmosphere.

The rotor 14 is secured by means of the screws 22 to the power shaft 23, which is mounted in a bearing bracket 24 secured in any desired manner to a lug or boss 25, it being noted that said bracket extends through the division member 26. The power shaft 23 is provided near each end, with an annular groove 27, which forms, with the bearing ring 28, carried by said bracket, a ball race for the balls 29.

30 designates a washer.

31 designates a pinion carried by the power shaft 23 and meshing with the gear 32 of the speed changing mechanism. This gear 32 is provided with an annular chamber in which is adapted to be located the friction ring 33 of the idler pinion 34.

35 designates a washer composed of fiber or any suitable friction material, and 36 designates a similar friction washer which engages the opposite side of the friction ring 33.

37 designates a friction disk to which the pins 38 are secured, said pins extending through the apertured free ends of the springs 39, the other ends of which are secured by screws or equivalent fastening devices 40 to the web of the gear 32.

The idler pinion 34 is provided near each end with a suitable groove, thereby adapting the same for ball bearings 41, the inner of which is seated in an extension of the casing member 26 while the other is suitably carried by the casing members 1 and 3.

42 designates the gear spindle which meshes with the idler 34 and against which the thrust ball bearing 43 abuts, it being noted that the gear portion of the spindle is recessed for this purpose.

The spindle portion of the gear spindle 42 is mounted in the journal bushing 44 which is carried by the casing member 3.

45 designates the tool socket which is maintained in position by means of the nut 46.

I will now describe the automatic brake for the rotor.

47 designates a friction ring provided with an annular groove 48 in which a strip of suitable frictional material 49 is secured by fastening devices 50.

51 designates upwardly extending arms having at their upper ends apertured lugs 52, to which the pistons 53 are secured by means of fastening devices 54.

The pistons 54 are mounted in piston chambers 55 in the feed head 2 and the springs 57 abut against the lugs 52 to maintain the pistons at their innermost position and thereby cause the engagement of the friction material 49 with the rotor 14, it being seen that the springs 57 are properly confined by the chambered nuts 58 against which they abut. As will be understood by reference to Figs. 1, 2, 4, 5 and 6, the motive fluid may pass from the passage 10 through port 59 and passage 60 into passage 61 and thence through ports 62 and 63 into the piston chambers 55.

64 designates the feed screw which may be of any usual or conventional construction.

In order to provide for the proper lubrication of the drill at all times, an oil hole plug 65 has threaded or other engagement with the main casing 1, whereby grease or other lubricant may be placed within the drill, it being noted that the casing member 3 and the journal bushing 44 are apertured as seen at 66 and that the gear spindle 42 is provided with a groove or aperture 67 communicating therewith, whereby the necessary lubrication of the spindle is assured.

The operation will now be readily apparent: As soon as the motive fluid is permitted to enter the passage 10 it will pass through port 59, passages 60 and 61 and ports 62 and 63 into piston chambers 55 and cause the pistons 54 therein to be raised against the tension of the springs 57, thereby causing the friction strip 49 to be raised out of engagement with the rotor 14. The motive fluid impinges against the buckets 13 and exhausts through passages 21. The rotor 14 by means of the power shaft 23 and pinion 31 causes the gear 32 of the transmission or speed changing mechanism to rotate, thereby actuating the idler 34, which is frictionally driven thereby and which drives the gear spindle in which the tool socket is mounted. In case the drill or other working tool should stick it will be apparent that owing to the provision of the friction clutch in the speed changing mechanism, the rotor may revolve while the drill spindle remains stationary, thereby rendering practical the application of the turbine to a portable drill. As soon as the motive fluid is shut off the springs 57 cause the friction strip 49 of the automatic friction brake to be immediately forced against the rotor, thus causing the same to quickly stop revolving.

In so far as I am aware I am the first in the art to employ, in a device of this character, a detachable stator, a rotor having turbine buckets therein, an automatic brake therefor, and a speed changing mechanism having a friction drive, and my claims for these features are to be interpreted with corresponding scope.

It will now be apparent to those skilled in the art that I have devised a novel and useful construction of a pneumatic drill, which embodies the features of advantage enumerated as desirable in the statement of invention and the above description and while I have shown a preferred embodiment thereof which gives good results in practice, it is to be understood that the same is susceptible of modification in various particulars without departing from the spirit and scope of the invention or sacrificing any of its advantages.

Having thus described my invention, what I claim as new and desire to secure by Letters Patent, is: —

1. In a pneumatic drill, a casing, a rotor having turbine buckets therein, speed changing mechanism for said rotor, and a detachable stator provided with channels for redirecting motive fluid against said buckets.

2. In a pneumatic drill, a casing, a rotor having turbine buckets therein, speed changing mechanism having a friction clutch an automatic brake for said rotor, and means for impinging the motive fluid against the rotor.

3. In a pneumatic drill, a casing, a rotor having turbine buckets therein, pistons actuated by the motive fluid for releasing said rotor, speed changing mechanism having a friction clutch, and a stator.

4. In a pneumatic drill, a casing, a rotor therein, speed changing mechanism for said rotor, means for impinging the motive fluid against the rotor, and an automatic brake for said rotor.

5. In a pneumatic drill, a casing, a rotor therein, a power shaft, ball bearings therefor, a gear driven by said shaft, an idler pinion frictionally driven by said gear, a spindle actuated by said pinion, and a detachable stator for said rotor.

6. In a pneumatic drill, a casing, a rotor therein, a power shaft for said rotor, a gear driven by said shaft, a pinion having a flange in frictional engagement with said gear, a gear spindle actuated by said pinion, and a stator for said rotor.

7. In a pneumatic drill, a casing, a rotor therein, a power shaft for said rotor, a gear driven by said shaft and having a chamber, a pinion having a flange engaging said chamber, a friction disk, yielding means for causing said disk to engage said flange, a gear spindle driven by said pinion, and a detachable stator for said rotor.

8. In a pneumatic drill, a casing, a rotor therein, a power shaft for said rotor, a gear driven by said shaft and having a chamber, a pinion having a flange engaging said chamber, a friction disk, yielding means carried by said gear for causing said disk to engage said flange, a gear spindle driven by said pinion, and a detachable stator for said rotor.

9. In a pneumatic drill, a casing, a rotor therein, a power shaft for said rotor, a gear driven by said shaft and having a chamber, a pinion mounted in ball bearings, having a flange engaging said chamber, a friction disk, yielding means for causing said disk to engage said flange, a gear spindle driven by said pinion, and a detachable stator for said rotor.

10. In a pneumatic drill, a casing, a rotor therein, a gear spindle, a thrust ball bearing between said rotor and spindle, speed changing mechanism co-acting with said rotor, and gear spindle, and a stator for said rotor detachably carried by said casing.

11. In a pneumatic drill, a casing, a bearing bracket therein, a power shaft mounted in said bracket, a rotor secured to said shaft, a gear spindle, speed changing mechanism intermediate said shaft and spindle, and a detachable stator for said rotor.

12. In a pneumatic drill, a casing, a bearing bracket therein, a power shaft mounted in said bracket, a rotor secured to said shaft, a gear spindle, speed changing mechanism intermediate said shaft and spindle, a detachable stator for said rotor and a fluid actuated brake for said rotor.

13. In a pneumatic drill, a casing, a rotor therein, speed changing mechanism for said rotor, a detachable stator, a friction ring, friction material carried thereby and co-acting with said rotor, pistons connected with said ring, and means for permitting motive fluid to actuate said pistons to raise said ring.

14. In a pneumatic drill, a casing, a rotor therein, speed changing mechanism for said rotor, a detachable stator, a friction ring, friction material carried thereby and co-acting with said rotor, pistons connected with said ring, yielding means for moving said pistons in one direction, and means for permitting motive fluid to move said pistons in the opposite direction.

15. In a pneumatic drill, a casing, a rotor with buckets therein, a detachable stator for said rotor, speed changing mechanism for said rotor, a friction ring, friction material secured thereto, pistons connected with said rings, springs co-acting with said pistons to cause said friction material to engage said rotor, and passages for leading motive fluid to said pistons to move them in the opposite direction.

16. In a pneumatic drill, a casing, a rotor with buckets therein, a detachable stator for said rotor, speed changing mechanism for said rotor including a friction clutch, a friction ring, friction material secured thereto, pistons connected with said rings, springs co-acting with said pistons to cause said friction material to engage said rotor, and passages for leading motive fluid to said pistons to move them in the opposite direction.

17. In a pneumatic drill, a casing, a rotor with buckets therein, means for impinging the motive fluid against the rotor speed changing mechanism for said rotor, a friction ring, friction material secured thereto, pistons connected with said rings, springs co-acting with said pistons to cause said friction material to engage said rotor, and passages for leading motive fluid to said pistons to move them in the opposite direction.

18. In a pneumatic drill, a casing, a bearing bracket therein, a rotor, a power shaft therefor and mounted in a plurality of ball bearings carried by said bracket, speed changing mechanism for said shaft, an automatic brake for said rotor, and a detachable stator in proximity to said rotor.

JOHN W. SMITH.

Witnesses:
H. S. FAIRBANKS,
C. D. McVAY.